July 9, 1957
A. MAURER
2,798,748
ANNULAR CLAMPING DISC
Filed Feb. 17, 1953
2 Sheets-Sheet 1
FIG.1.
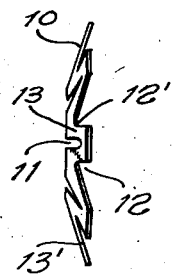
FIG.2.
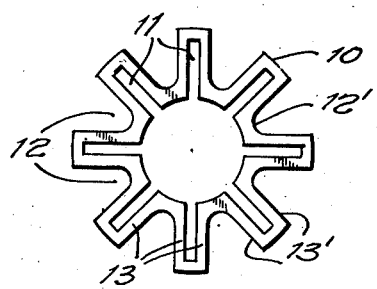
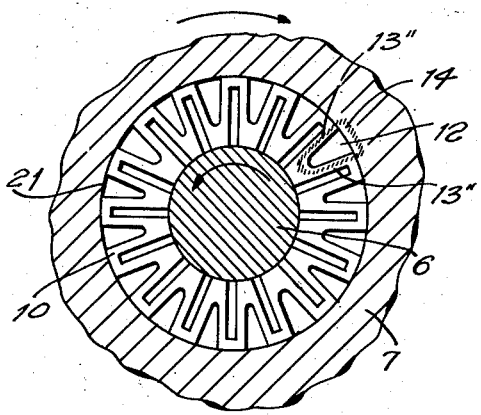
FIG.3.
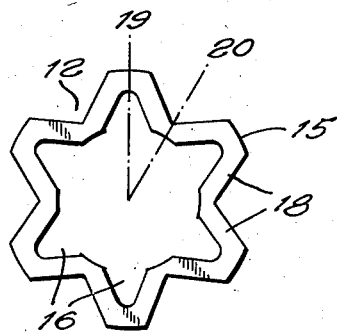
FIG.4.
INVENTOR.
ALBRECHT MAURER
BY July 9, 1957 — A. MAURER — 2,798,748
ANNULAR CLAMPING DISC
Filed Feb. 17, 1953 — 2 Sheets-Sheet 2

INVENTOR.
ALBRECHT MAURER
BY

United States Patent Office 2,798,748
Patented July 9, 1957

2,798,748

ANNULAR CLAMPING DISC

Albrecht Maurer, Bad Homburg vor der Hohe, Germany

Application February 17, 1953, Serial No. 337,352

Claims priority, application Germany February 20, 1952

5 Claims. (Cl. 287—52)

The present invention relates to annular clamping discs or washers, and more particularly to a dished annular clamping disc or washer formed with angularly spaced triangular cut outs extending inwardly from the outer edge of the disc.

It is the object of the present invention to provide a dished annular clamping disc formed with cut outs defining spoke portions in the disc which together with an outer clamped element form triangular stress transferring frames preventing bending or buckling of the spoke portions.

It is a further object of the present invention to provide an annular clamping disc which can be produced by a single stamping operation.

With these objects in view the present invention mainly consists in a dished annular disc having an inner edge, and an outer edge spaced in axial and radial directions from said inner edge so that the clamping disc is adapted to clampingly engage an outer element with said outer edge and an inner element with said inner edge when the axial distance between said outer edge and said inner edge is reduced whereby the radial distance between the edges is increased.

The clamping disc according to the present invention is formed with a plurality of angularly spaced triangular cut outs extending inwardly from the outer edge of the disc and having apices located intermediate the outer and inner edges and preferably nearer to the inner edge of the disc. The triangular cut outs define in the disc spoke portions, adjacent spoke portions forming with the outer clamped element stress transferring frames preventing bending of the spoke portions.

The clamping disc according to the present invention is further formed with slots extending from the inner edge of the disc into the spoke portions. According to one embodiment of the present invention the slots are rectangular, and the side edges of the spoke portions parallel so that the spoke portions extend in radial direction. According to another embodiment of the present invention, the inner slots are replaced by triangular cut outs so that the annular clamping disc has the shape of a zig-zag strip, permitting provision of long spoke portions even if the radial extension of the annular clamping disc is small.

The clamping discs according to the present invention are capable of clamping two elements together and can be substituted for keys on shafts, and for other means for non-rotatably securing elements to rotary shafts. Annular discs according to the present invention may also be advantageously applied as a resilient means permitting resilient axial movement between two elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a side view of an annular clamping disc according to the present invention;

Fig. 2 is a front view of the same;

Fig. 3 is a front view of a clamping arrangement according to the present invention illustrating the distribution of stresses;

Fig. 4 is a front view of a modified embodiment of the present invention; and

Figure 5:
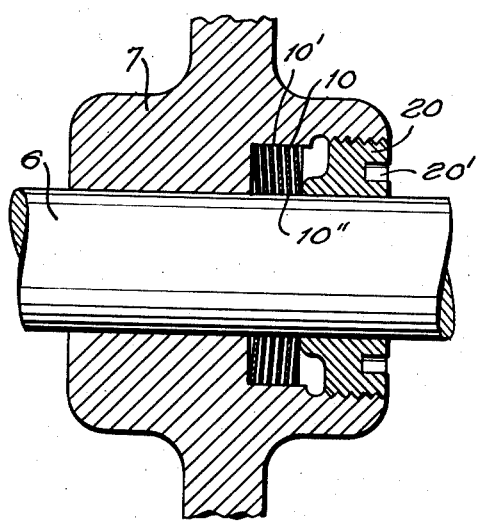
Figs. 5, 6 and 7 are sectional views of clamping arrangements according to the present invention.

Referring now to the drawings and more particularly to Figs. 1 and 2, the dished annular clamping disc or washer 10 stamped out of a resilient thin rigid material has a frusto-conical shape and is bounded by an outer edge 10' and an inner edge 10''. Triangular cut outs 12 are provided which have rounded apices 12' located near the inner edge 10''. Between the cut outs 12 remain spoke portions 13 having parallel side edges 13' extending substantially parallel to the radial plane of symmetry of the respective spoke portion 13. Each spoke portion is formed with an elongated rectangular slot or cut out 11.

Fig. 3 illustrates a clamping disc or washer according to the present invention which is used for clamping an outer element 7 having an inner cylindrical surface 21 to a cylindrical shaft 6. The free outer ends of hatched spoke portions 13'', which constitute the outer edge of the clamping disc, are pressed against the inner surface 21 of the outer element 7. The hatched portion 14 of the outer element 7 forms together with the spoke portion 13'' a triangular frame through which the stresses are transferred in such manner that the spoke portions 13'' are not subject to bending forces but only the longitudinal stresses. Consequently a deformation of the spoke portions is prevented when torsional forces are transferred from the shaft element 6 to the outer element 7.

In the modified embodiment shown in Fig. 4 the inner cut outs 16 of the clamping disc or washer 15 are triangular, the side edges of the inner triangular cut outs 16 and the outer triangular cut outs 12 being substantially parallel so as to form strip-shaped portions 18 which are inclined with respect to the radial planes of symmetry 19, 20 of the inner and outer cut outs, respectively.

The washers 10, 15 according to the present invention can be stamped out in a single operation, the shape of the cut outs permitting easy removal of cut out sheet portions.

Referring now to Fig. 5 which shows a clamping arrangement according to the present invention, a plurality of resilient dished annular clamping discs or washers 10 or 15 are shown in clamping position on the shaft element 6 tightly engaging the same with the inner edges 10'', and tightly engaging with the outer edges 10' the inner cylindrical surface of outer element 7. The outer diameters of the discs are increased, and the inner diameters are decreased by screwing the member 20 into the element 7 whereby the axial distance between the outer edge and the inner edge of each clamping disc is reduced, and the inner and outer edge 10'', 10' are pressed against the shaft 6 and the outer element 7, respectively. Bores 20' are provided in the member 20 for receiving a suitable tool.

Figure 6:
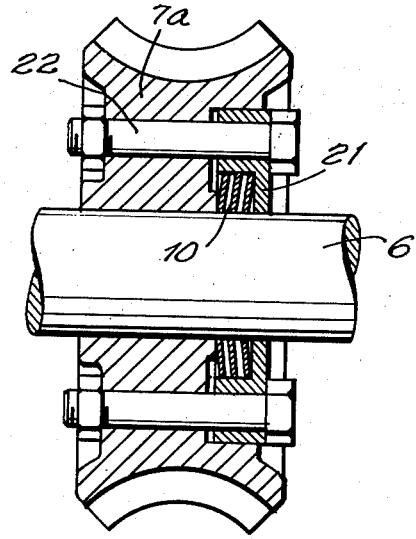

The clamping arrangement shown in Fig. 6 is similar. A shaft 6 and an outer element, shown to be a worm wheel 7a, are connected to each other for rotation by the member 21 which is clamped to the shaft 6 by means of the clamping discs 10, which are pressed into clamping position by the nut and bolt means 22.

Figure 7:
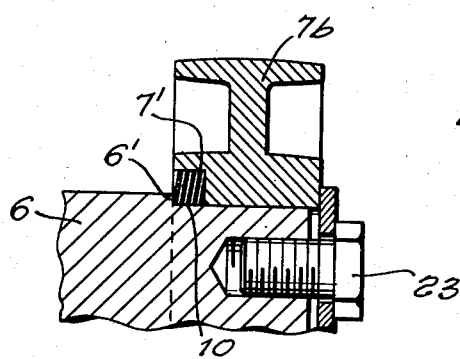

In the clamping arrangement shown in Fig. 7, a shaft 6 is provided with a shoulder 6', and an outer element, shown as a pulley 7b, and formed with an inner shoulder 7', are clamped together by a plurality of clamping discs 10 when the bolt 23 is screwed into the shaft 6 and moves the outer element 7b in axial direction towards the shoulder 6' of the shaft 6.

In the clamping arrangements illustrated in Figs. 5, 6 and 7 reducing of the axial distance between the outer edge and the inner edge of each dished clamping disc 10 causes an increase of the outer diameter of the outer edge, and a decrease of the inner diameter of the inner edge of each clamping disc whereby the inner and outer elements are clamped together. It is obvious that clamping arrangements of the type described eliminate the need for a key on the shaft 6.

It will be understood that each of the elements described above, or two or more together, may also find a useful application in other types of dished annular clamping discs or washers differing from the types described above.

While the invention has been illustrated and described as embodied in a frusto-conical annular clamping disc or washer formed with triangular cut outs so that spoke portions are formed which are only subject to longitudinal stresses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A clamping arrangement comprising, in combination, an inner element having a cylindrical outer surface portion; an outer element having a cylindrical inner surface portion encompassing said outer surface portion of said inner element and forming an annular space therewith; at least one annular washer made of resilient material and having inner and outer annular edges, said washer being arranged in said annular space, encompassing said outer surface portion of said inner element and normally having a substantially frusto-conical shape wherein said inner and outer edges are axially displaced relative to each other, wherein said outer edge has a diameter slightly smaller than the diameter of said inner surface portion of said outer element and wherein said inner edge has a diameter slightly greater than the diameter of said outer surface portion of said inner element, said washer being formed with a plurality of angularly spaced outwardly flaring triangular cut-outs which open on said outer edge, the apices of said triangular cut-outs being spaced from said inner edge so as to form spoke portions; and means for moving said inner and outer edges of said washer toward each other in axial direction, thereby increasing the outer diameter and decreasing the inner diameter of said washer so that the outer ends of said spoke portions may engage said inner surface portion of said outer element and said inner edge may engage said outer surface portion of said inner element, whereby said inner and outer elements may be clamped to each other, with each two adjacent spoke portions, together with said outer element, forming a triangular stress transferring frame.

2. A clamping arrangement comprising, in combination, an inner element having a cylindrical outer surface portion; an outer element having a cylindrical inner surface portion encompassing said outer surface portion of said inner element and forming an annular space therewith; at least one annular washer made of resilient material and having inner and outer annular edges, said washer being arranged in said annular space, encompassing said outer surface portion of said inner element and normally having a substantially frusto-conical shape wherein said inner and outer edges are axially displaced relative to each other, wherein said outer edge has a diameter slightly smaller than the diameter of said inner surface portion of said outer element and wherein said inner edge has a diameter slightly greater than the diameter of said outer surface portion of said inner element, said washer being formed with a plurality of angularly spaced outwardly flaring triangular cut-outs which open on said outer edge, the apices of said triangular cut-outs being spaced from said inner edge so as to form spoke portions, said washer being further formed with slots extending from said inner edge into said spoke portions, respectively, and having ends spaced from said outer edge so as to divide each spoke portion into two leg portions; and means for moving said inner and outer edges of said washer toward each other in axial direction, thereby increasing the outer diameter and decreasing the inner diameter of said washer so that the outer ends of said leg portions may engage said inner surface portion of said outer element and the inner ends of said leg portions may engage said outer surface portion of said inner element, whereby said inner and outer elements may be clamped to each other, with each two adjacent spoke portions, together with said outer element, forming a triangular stress transferring frame.

3. The combination defined in claim 2 wherein said slots are substantially triangular and flare toward said inner edge, and wherein said cut-outs and slots are so shaped that said leg portions have substantially parallel side edges.

4. The combination defined in claim 2 wherein each of said spoke portions has parallel side edges extending parallel to the radial plane of symmetry of the respective spoke portion.

5. The combination defined in claim 4 wherein said slots are substantially rectangular and extend substantially radially.

References Cited in the file of this patent

UNITED STATES PATENTS

| | | |
|---|---|---|
| 345,767 | Buckley | July 20, 1886 |
| 404,284 | Johnson | May 28, 1889 |
| 873,424 | Greene | Dec. 10, 1907 |
| 1,008,794 | Denis | Nov. 14, 1911 |
| 1,192,404 | Ewart | July 25, 1916 |
| 1,427,807 | Halbleib | Sept. 5, 1922 |
| 2,326,866 | Kincaid | Aug. 17, 1943 |
| 2,336,044 | Stuart | Dec. 7, 1943 |
| 2,367,909 | Wanner | Jan. 23, 1945 |
| 2,460,510 | Laesser | Feb. 1, 1949 |